United States Patent [19]
Hager et al.

[11] Patent Number: 6,019,578
[45] Date of Patent: Feb. 1, 2000

[54] VARIABLE DIAMETER ROTOR BLADE ACTUATION SYSTEM

[75] Inventors: Lee N. Hager, Southbury; Paul C. Fitzgerald, Sandy Hook, both of Conn.

[73] Assignee: Sikorsky Aircraft Corporation, Stratford, Conn.

[21] Appl. No.: 09/215,718

[22] Filed: Dec. 18, 1998

[51] Int. Cl.$^7$ .......................... B64C 11/04; B64C 27/72; F01D 7/00; F03B 3/14

[52] U.S. Cl. .................................. 416/87; 416/88; 416/89; 416/170 R; 416/169 R; 244/8; 244/17.23; 244/56; 244/39; 475/296; 475/269; 475/302

[58] Field of Search ................................ 416/87, 88, 89, 416/170 R, 169 R; 244/8, 17.23, 56, 39; 475/296, 269, 302

[56] References Cited

U.S. PATENT DOCUMENTS

| | | |
|---|---|---|
| 4,080,097 | 3/1978 | Hager et al. ............................... 416/87 |
| 4,142,697 | 3/1979 | Fradenburgh ........................... 244/7 R |
| 4,566,856 | 1/1986 | Miller .................................. 416/134 A |
| 4,580,945 | 4/1986 | Miller .................................. 416/134 A |
| 4,804,352 | 2/1989 | Schmidt .................................... 464/17 |
| 5,116,201 | 5/1992 | Fradenburgh et al. ................. 416/140 |
| 5,253,979 | 10/1993 | Fradenburgh et al. ............. 416/223 R |
| 5,299,912 | 4/1994 | Fradenburgh et al. .................... 416/87 |
| 5,620,303 | 4/1997 | Moffitt et al. ............................. 416/87 |
| 5,620,304 | 4/1997 | Matsuka et al. .......................... 416/87 |
| 5,636,969 | 6/1997 | Matsuka et al. .......................... 416/87 |
| 5,642,982 | 7/1997 | Matsuka et al. .......................... 416/87 |
| 5,655,879 | 8/1997 | Kiely et al. ............................... 416/87 |
| 5,735,670 | 4/1998 | Moffitt et al. ............................. 416/87 |

*Primary Examiner*—Edward K. Look
*Assistant Examiner*—Rhonda Barton
*Attorney, Agent, or Firm*—Seidel, Gonda, Lavorgna & Monaco, PC

[57] ABSTRACT

A rotor blade actuation system is disclosed for controlling extension and retraction of an outboard blade section of a rotor blade by varying the speed and direction of rotation between a main rotor shaft and a blade actuation shaft. The rotor blade actuation system includes a drive gear on the main rotor shaft and a blade actuation drive gear on the blade actuation drive shaft. A primary drive unit is engaged with and transmits rotary motion from the main rotor shaft to the blade actuation shaft. The primary drive unit includes an input gear engaged with the drive gear. A primary drive is engaged with the drive gear through an input gear and a master clutch. An output drive is engaged with the blade actuation drive gear. A forward clutch controls engagement of a forward planetary gearset with the primary drive and the output drive. The engagement of the forward planetary gearset causes the blade actuation shaft to rotate in the same direction as the rotation of the main rotor shaft. A reverse clutch controls engagement of a reverse planetary gearset with the primary drive and the output drive. The engagement of the reverse planetary gearset with the primary drive and the output drive causes the blade actuation shaft to rotate in the opposite direction from the rotation of the main rotor shaft. A rotor blade actuation control unit controls engagement and disengagement of the forward and reverse clutches.

18 Claims, 8 Drawing Sheets

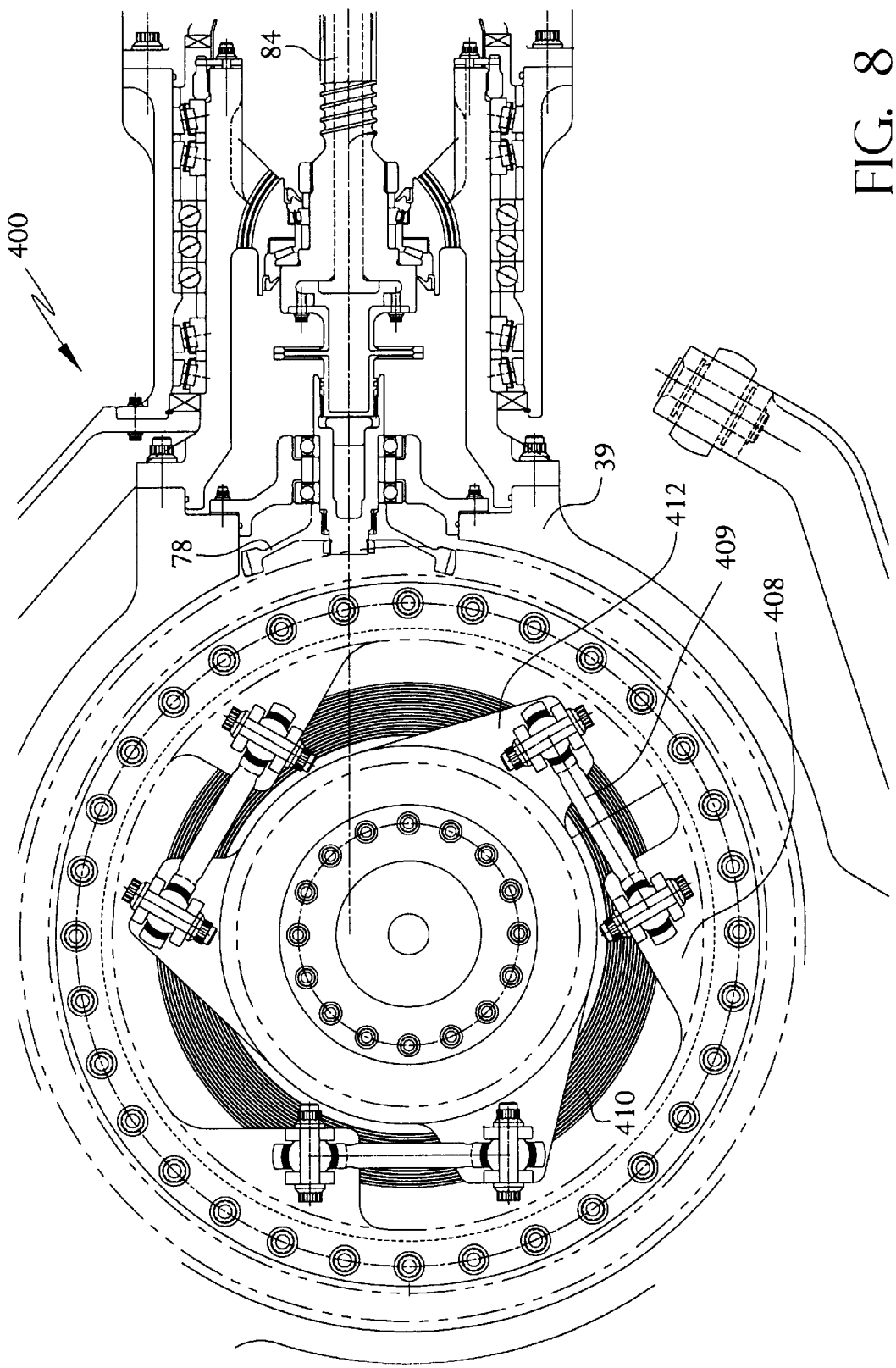

VARIABLE DIAMETER ROTOR BLADE ACTUATION SYSTEM

FIELD OF THE INVENTION

This invention relates to a Variable Diameter Rotor (VDR) system for tilt rotor and/or tilt wing aircraft, and more particularly, to a VDR actuation system for controlling extension and retraction of a plurality of extendable rotor blades.

BACKGROUND OF THE INVENTION

A tilt rotor or tilt wing aircraft typically employs a pair of rotor systems which are supported at the outermost end of a wing structure and are pivotable such that the rotors may assume a vertical or horizontal orientation. In a horizontal orientation (i.e., horizontal rotor plane), the aircraft is capable of hovering flight, while in a vertical orientation (i.e., vertical rotor plane), the aircraft is propelled in the same manner as conventional propeller-driven fixed-wing aircraft.

Currently, tilt rotor and tilt wing aircraft employ conventional fixed-diameter rotor systems which are aerodynamically and aeroelastically designed in a manner that attempts to blend the competing requirements for hovering and forward flight modes of operation. For example, with regard to hovering flight, it is generally advantageous to employ a large diameter rotor to improve hovering performance by lowering disk loading, reducing noise levels, and reducing downwash velocities. Conversely, a relatively small diameter rotor is desirable in forward flight to improve propulsive efficiency by minimizing blade aero-elastic properties, minimizing blade area, and reducing tip speed (Mach number).

Variable Diameter Rotor (VDR) systems are known to provide distinct advantages over conventional fixed-diameter rotors insofar as such systems are capable of successfully operating in both modes of operation. That is, when the plane of the rotor is oriented horizontally, the rotor diameter is enlarged for improved hovering efficiency and, when oriented vertically, the rotor diameter is reduced for improved propulsive efficiency.

An example of one VDR system and VDR blade assembly is shown in U.S. Pat. No. 3,768,923 which discloses a blade assembly with an outer blade segment configured to telescope over a torque tube member. The size of the rotor diameter is varied by controlling the extension and/or retraction of the outer blade segment. The outer blade segment includes a structural spar which carries the primary loads of the outer blade segment, a leading edge sheath assembly and trailing edge pocket assembly, which sheath and pocket assemblies envelop the spar section to define the requisite aerodynamic blade contour. The torque tube member is mounted to the rotor hub assembly. The spar member of the outer blade segment slides over the torque tube member. In addition to supporting the outer blade segment, the torque tube member functions to transfer flapwise and edgewise bending loads to and from the rotor hub while imparting pitch motion to the outer blade segment.

A retraction/extension mechanism is located within the torque tube member and spar. In one embodiment of the invention, the retraction/extension mechanism includes a threaded jackscrew which may be driven in either direction by a bevel gear arrangement disposed internally of the rotor hub assembly. The jackscrew engages a plurality of stacked nuts which are permitted to translate axially along the jackscrew upon rotation thereof. Centrifugal load straps extend from each nut and are affixed via a retention plate to the tip end of the spar member. As the jackscrew turns, the stacked nuts are caused to translate inwardly or outwardly, thereby effecting axial translation of the outer blade segment. Systems relating to and/or further describing VDR systems are discussed in U.S. Pat. Nos. 3,884,594, 4,074,952, 4,007,997, 5,253,979, and 5655,879.

U.S. Pat. No. 5,299,912 discloses another retraction/extension mechanism for a variable diameter rotor system. The retraction/extension mechanism includes coaxial rotor shafts which are engaged with the rotor blade. More particularly, the outer rotor shaft is attached to a rotor hub through a gimbaled bearing and provides rotational control over the rotor blade. The inner rotor shaft is attached to a bevel gear which, in turn, meshes with a bevel pinion mounted on a jackscrew. The jackscrew is engaged with the outer blade segment as described above. Rotation of the inner shaft produces corresponding rotation of the jackscrew, which extends or retracts the outer blade segment.

U.S. Pat. No. 5,299,912 also discloses a blade actuation system for controlling the extension and retraction of the outer blade segment by controlling the speed differential between the main rotor shaft and the blade actuation shaft.

The primary drawback of the prior art systems is that they were designed primarily for developmental purposes. Those designs typically did not accommodate the dynamic loads that are produced in full size hardware designs, including gear tooth bending loads, and hertz stress to accommodate the torque load required to operate a driving screw member. The driving screw torque is a direct function of the centrifugal force created by the components of each blade assembly.

A need, therefore, exists for an improved blade actuation system for a variable diameter rotor system.

SUMMARY OF THE INVENTION

A rotor blade actuation system is disclosed for a variable diameter rotor system. The variable diameter rotor system includes a plurality of rotor blade assemblies mounted to and rotated by a rotor hub assembly about an axis of rotation. Each rotor blade assembly has an inboard blade section and an outboard blade section. The outboard blade section is telescopically mounted to the inboard blade section. Actuation of the outboard blade section is controlled by the rotor blade actuation system by varying the speed and direction of rotation between a main rotor shaft and a blade actuation shaft.

The rotor blade actuation system includes a drive gear on the main rotor shaft which has a first set of teeth formed on it. A blade actuation drive gear is formed on the blade actuation drive shaft and has a first set of teeth on it.

A primary drive unit is engaged with and transmits rotary motion from the main rotor shaft to the blade actuation shaft. The primary drive unit includes an input gear engaged with the first set of teeth on the drive gear. A primary drive is engaged with the input gear by means of a master clutch. The master clutch controls transmission of rotary motion between the input gear and the primary drive.

An output gear is engaged with the first set of teeth on a blade actuation drive gear. The output gear is also engaged with an output drive.

A forward planetary gearset is selectively engaged with the primary drive and the output drive. The forward planetary gearset is operative for transmitting rotary motion from the primary drive to the output drive. The engagement of the forward planetary gearset causes the blade actuation shaft to rotate in the same direction as the rotation of the main rotor shaft.

A forward clutch controls the engagement of the forward planetary gearset with the primary drive and the output drive.

A reverse planetary gearset is selectively engaged with the primary drive and the output drive. The reverse planetary gearset is operative for transmitting rotary motion from the primary drive to the output drive. The engagement of the reverse planetary gearset with the primary drive and the output drive causes the blade actuation shaft to rotate in the opposite direction from the rotation of the main rotor shaft.

A reverse clutch controls the engagement of the reverse planetary gearset with the primary drive and the output drive.

The actuation control system also includes a rotor blade actuation control unit for controlling engagement and disengagement of the forward and reverse clutches.

In one embodiment of the invention, the rotor blade actuation control unit includes a profile for controlling the engagement and disengagement of at least one of the clutches. The profile includes ramp-up and ramp-down portions during which times the clutch is permitted to slip.

The primary drive unit may also include a brake which engages with the primary drive. The rotor blade actuation control unit uses the profile to control engagement and disengagement of the brake.

In one embodiment of the invention, the rotor blade actuation system further includes a secondary drive unit for transmitting rotary motion from the main rotor shaft to the blade actuation shaft in the event of failure of the primary drive unit.

The foregoing and other features and advantages of the present invention will become more apparent in light of the following detailed description of the preferred embodiments thereof, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

FIG. 8 is a cross-sectional view taken along lines 8—8 in FIG. 7.

DETAILED DESCRIPTION OF THE PREFERRED EMBODIMENTS

Figure 1A:
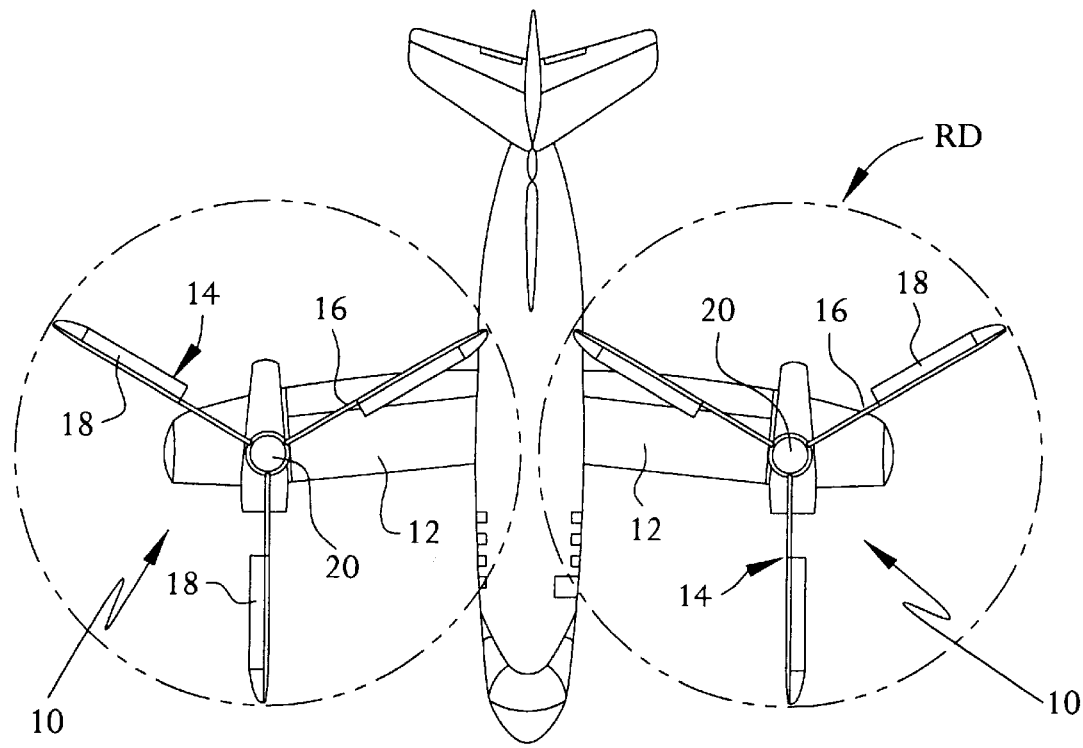
FIG. 1A is a plan view of a tilt-rotor aircraft illustrating the variable diameter rotor system according to the present invention in its horizontal position.
Figure 1B:
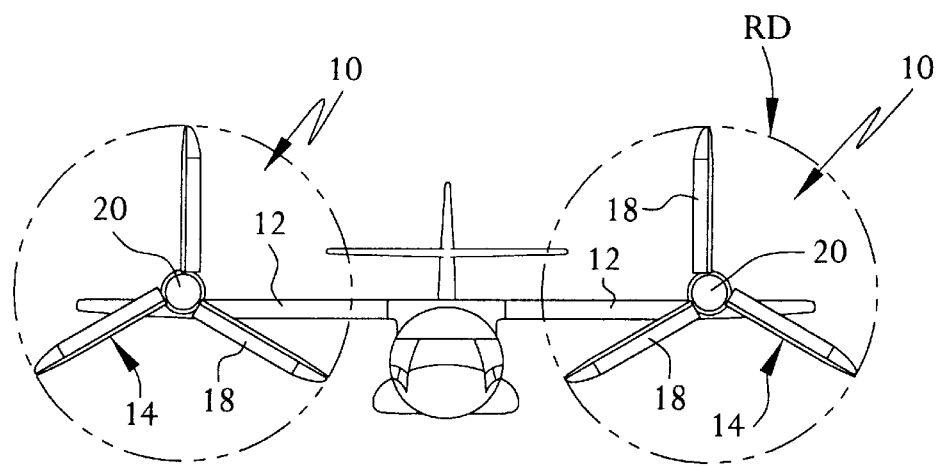
FIG. 1B is a front view of a tilt-rotor aircraft illustrating the variable diameter rotor system according to the present invention in its vertical position.

Referring now to the drawings, wherein like reference numerals illustrate corresponding or similar elements throughout the several views, FIGS. 1A and 1B illustrate a tilt rotor aircraft that includes a pair of variable diameter rotor (VDR) systems 10 according to the present invention. The VDR systems 10 are shown pivotally mounted on laterally extending wing sections 12 of the aircraft. The VDR systems 10 are pivotable between a horizontal or hover flight position, shown in FIG. 1A, and a vertical or forward flight position, shown in FIG. 1B.

Each VDR system 10 includes a plurality of variable diameter rotor blade assemblies 14 which are capable of being extended and retracted to vary the size of the rotor diameter RD as needed. More particularly, in order to provide the maximum vertical lift for the aircraft, it is desirable to increase the size of the rotor diameter RD by extending the rotor blade assemblies 14. Conversely, in forward flight it is generally more desirable to shorten the rotor diameter RD by retracting the rotor blade assemblies 14.

In order to effectuate the change in diameter, the variable diameter rotor blade assemblies 14 include a torque tube member 16 and an outer blade segment 18 which telescopes over the torque tube member 16. The general structure of one suitable variable diameter rotor blade assembly 14 for use in the present invention is disclosed in U.S. Pat. Nos. 5,655,879 and 5,636,969, the disclosures of which are incorporated herein by reference in their entirety.

Figure 2:
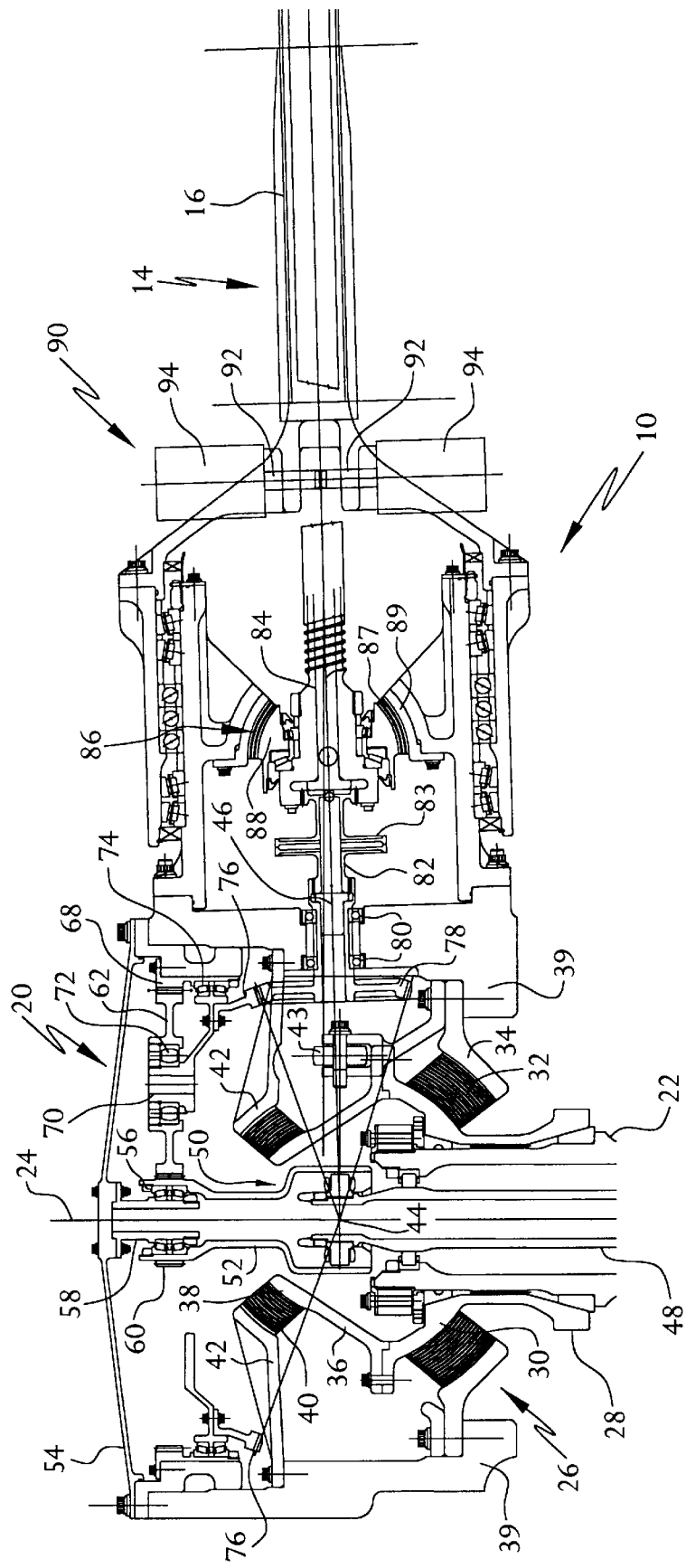
FIG. 2 is a cross-sectional side view of one embodiment of the variable diameter rotor system according to the present invention.

The variable diameter rotor system 10 also includes a rotor hub assembly 20 to which the rotor blade assemblies 14 are mounted. Referring to FIG. 2, a cross-sectional view of the variable diameter rotor system 10 is shown illustrating the rotor hub assembly 20 in more detail. The rotor hub assembly 20 is mounted to a main rotor shaft 22 which is operative for rotatably driving the rotor hub assembly 20 (and rotor blade assemblies 14) about a rotational axis 24. The main rotor shaft 22 is conventional in the art and, thus, no further discussion is needed. The main rotor shaft 22 is attached to a transmission (not shown) which rotates the main rotor shaft in a prescribed direction and at a suitable speed.

The main rotor shaft 22 is attached to the rotor blade assemblies 14 through a gimbaled bearing 26 arrangement. The gimbaled bearing 26 transmits rotor thrust loads to the main rotor shaft and permits the hub assembly 20 to have limited angular (pivotal) movement with respect to the main rotor shaft 22. The gimbaled bearing 26 provides the ability to tilt the rotor plane relative to the main rotor shaft 22 centerline resulting in a thrust vector that is used to maneuver the aircraft in the helicopter mode. The gimbaled pivot bearing 26 also provides reduced blade root stresses resulting from out of plane blade flapping motion that occurs from rotor cyclic and vertical gust inputs. The gimbaled bearing 26 includes a lower bearing support 28 which is engaged with an upper portion of the main rotor shaft 22. Any conventional method for attaching the lower bearing support 28 to the main rotor shaft 22 can be used such that rotary motion can be transmitted therebetween. In one preferred embodiment, the engagement between the lower bearing support 28 and the main rotor shaft 22 is provided by a splined connection. The lower bearing support 28 surrounds at least a portion of the upper end of the main rotor shaft 22 and includes a lower bearing surface 30 which is preferably substantially hemispherical in shape.

A first elastomeric thrust bearing 32 is located adjacent to the lower bearing surface 30. Elastomeric bearings are well known in the art and generally comprise alternating layers of elastomer and nonresilient shims. See, for example, U.S. Pat. No. 4,203,708. The number of elastomer layers and shims is not limited to the number shown in the figures but, instead, would be determined by the applied rotor loads. The first elastomeric bearing 32 is preferably hemispherical in shape and located substantially concentric with the rotor hub assembly 20 so as to be rotatable about the rotational axis 24. A lower bearing member 34 is disposed about and in contact with the outer surface of the first elastomeric bearing 32, so as to sandwich the first elastomeric bearing 32 between the lower bearing member 34 and the lower bearing surface 30. The lower bearing member 34 is attached to a rotor hub 39 for transmitting rotational motion therebetween.

The gimbaled bearing 26 also includes an upper bearing support 36 which is attached to the lower bearing support 28 through any conventional means, such as a bolted. The upper bearing support 36 includes an upper bearing surface 38 which, in one embodiment, is preferably continuous about the rotational axis 24 and has a center of rotation which is substantially co-linear with the rotational axis 24. A second elastomeric preload bearing 40 is disposed on the upper bearing surface 38. The second elastomeric bearing 40 is constructed similar to the first elastomeric bearing 32. The second elastomeric bearing 40 is mounted so as to provide preloading of the bearing assembly 26. The preload is preferably equal to the rotor thrust load plus 1.5 g's. The preload is sized such that when the maximum thrust load is applied to the first elastomeric bearing 32, no tensile stresses (i.e., complete loss of compression load) results in the second elastomeric bearing 40.

An upper bearing member 42 is disposed on the outer surface of the second elastomeric bearing 40. As such, the second elastomeric bearing 40 is sandwiched between the upper bearing member 42 and the upper bearing surface 38. The upper bearing member 42 is attached to the hub 39. A torque link 43 connects the upper bearing support 36 to the upper bearing member 42.

Figure 3:
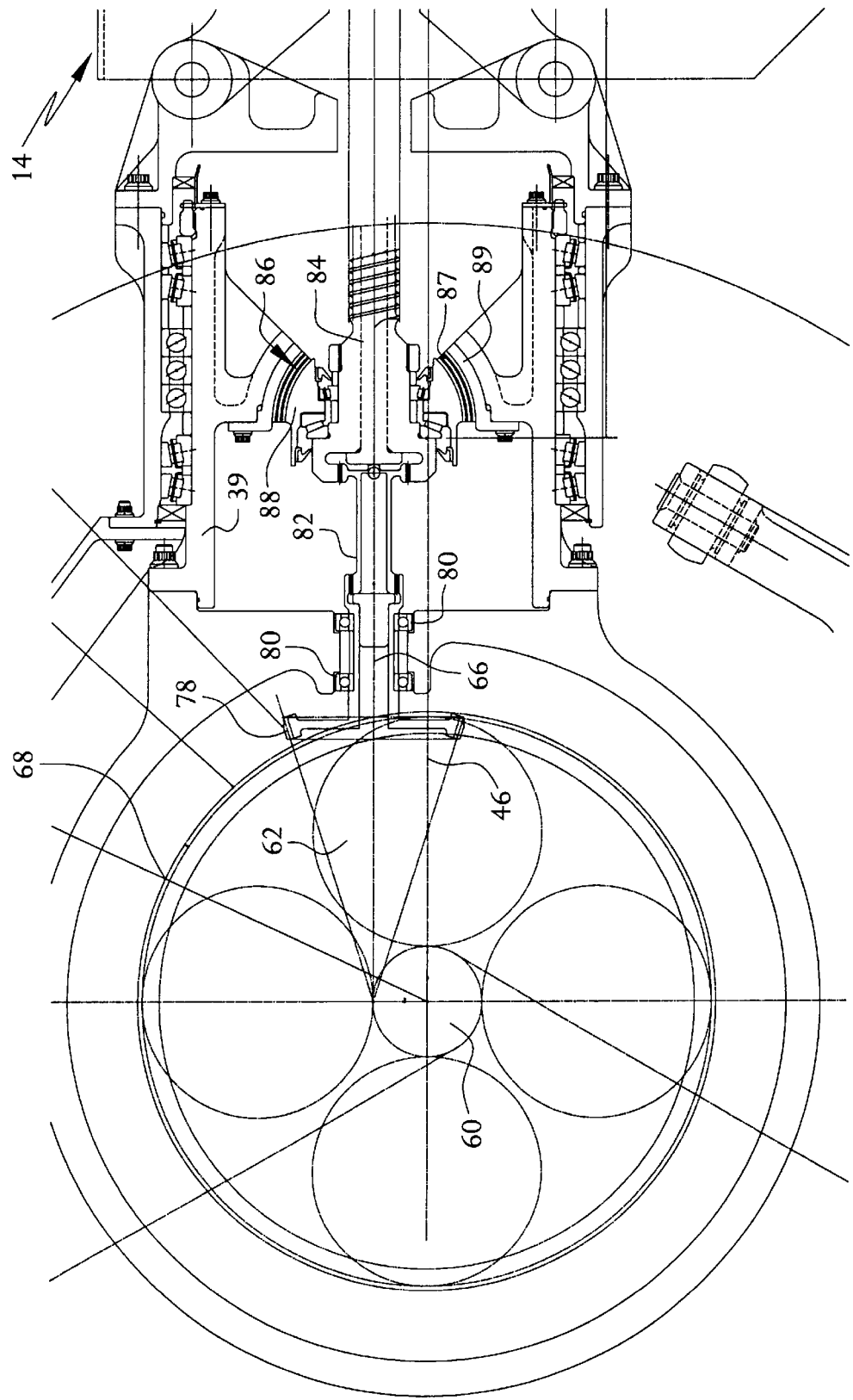
FIG. 3 is a cross-sectional top view of the variable diameter rotor system of FIG. 2.

In the illustrated embodiment, the elastomeric spherical bearings 32, 40 are not permitted to transmit torque since the application of torque would reduce the angular capacity of the bearings. Instead, the present invention transmits drive torque around the spherical bearings by using a link-type rotary coupling (constant velocity joint), similar to the rotary coupling shown in U.S. Pat. No. 4,804,352, which is incorporated herein by reference in its entirety. The rotary coupling 50 is shown in greater detail in FIGS. 6A and 6B and will be discussed in more detail below. The elastomeric bearings 32, 40 are mounted so as to permit limited pivoting of the rotor head assembly 20 about a pivot center 44 which is located at the intersection of the rotational axis 24 and the longitudinal pitch axis 46 of the rotor blade as shown in FIG. 3. That is, the elastomeric bearings 32, 40 are each preferably formed with a hemispherical shape and have a common center of curvature. The center of curvature defines the point about which the rotor hub assembly can pivot with the least amount of out-of-plane loading (i.e., the pivot center).

The gimbaled arrangement shown in the figures and discussed above permits approximately 12° of pivotable motion. The 12° of motion allows the rotor head to vary the orientation of the rotor plane from its normal or true horizontal plane allowing thrust in the horizontal plane when the aircraft is in the helicopter or vertical mode of flight.

In order to control extension and retraction of the outer blade segment 18, the present invention includes a second drive shaft. As shown in FIG. 2, the second drive shaft or blade actuation shaft 48 is preferably located within the main rotor shaft 22. More particularly, the blade actuation shaft 48 is preferably mounted concentrically within and rotatable with respect to the main rotor shaft 22. The blade actuation shaft 48 is engaged with a suitable actuation system so as to be rotatable relative to the main rotor shaft 22.

Since the rotor hub assembly is gimbaled, the attachment between the blade actuation shaft 48 and the rotor blade assemblies 14 must be designed to accommodate up to 12° of rotor hub pivoting, as well as vertical displacement caused by the thrust of the rotor. These thrust loads must be isolated from the blade actuation shaft 48. The incorporation of a linear constant velocity joint 50 in the present invention at the elastomeric bearing pivot center provides the required isolation.

Figure 6A:
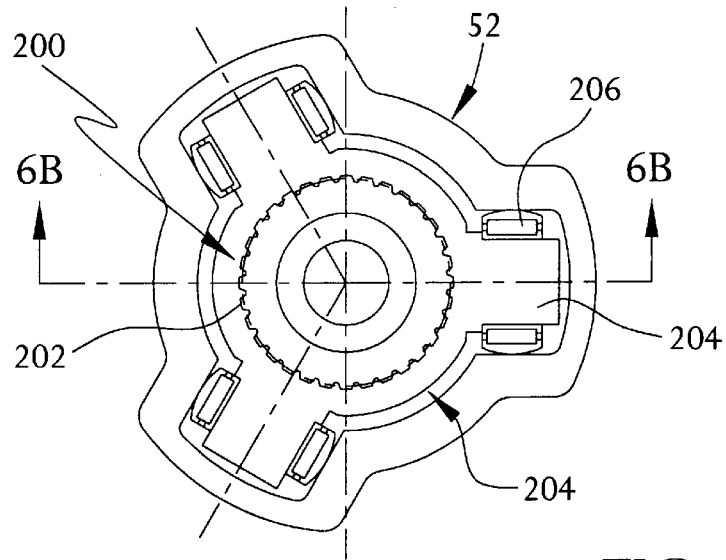
FIG. 6A is a cross-sectional view of a linear constant velocity joint suitable for use in the present invention.
Figure 6B:
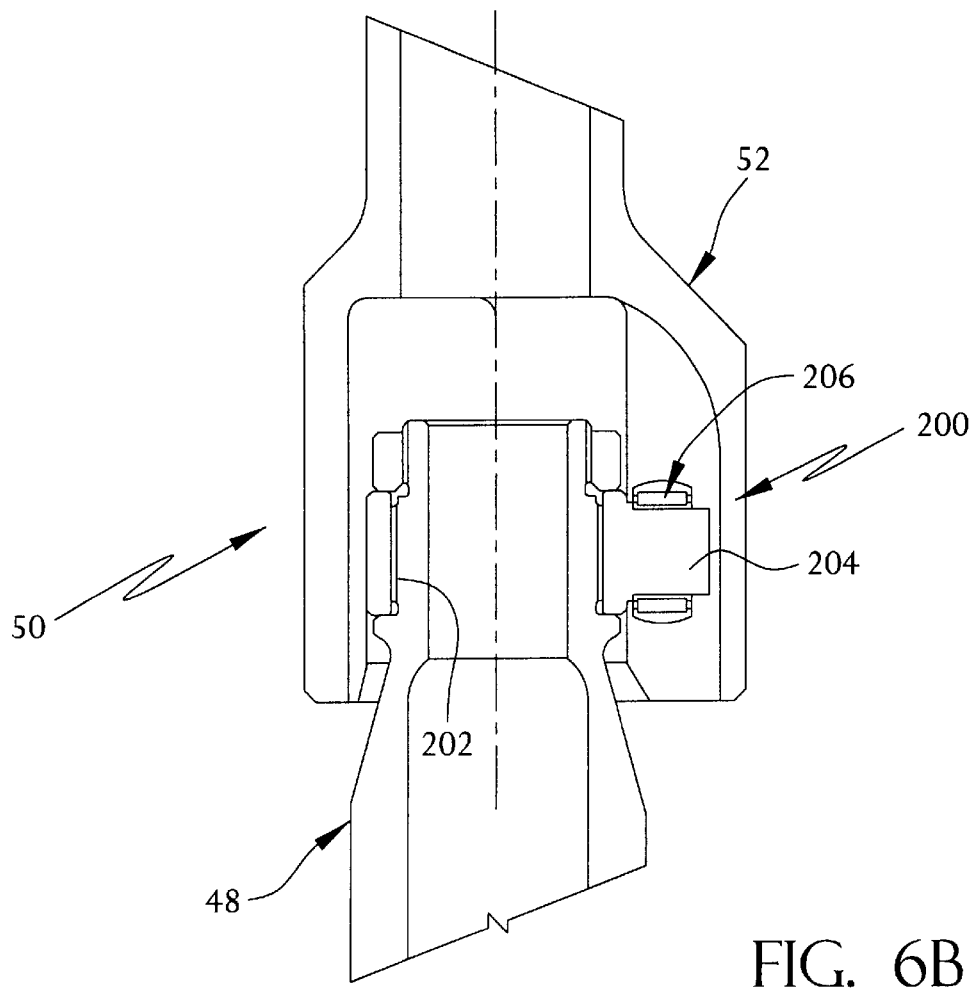
FIG. 6B is a cross-sectional view of the linear constant velocity joint of FIG. 6A taken along lines 6B—6B.

Referring to FIGS. 2, 6A and 6B, the linear constant velocity joint 50 is used to couple the blade actuation shaft 48 to the rotor blade assemblies 14. The constant velocity joint 50 is designed to transmit torque from the blade actuation shaft 48 to the rotor blade assemblies 14, while permitting axial and pivotal motion of the rotor hub assembly 20. In one embodiment of the invention, the constant velocity joint 50 includes an output housing 52 and an input assembly 200. The input assembly 200 is connected to the blade actuation shaft 48 through a splined connection 202. The input assembly 200 includes a tri-lobed trunnion 204 with needle bearing rollers 206 rotatably mounted around each trunnion 204. The outer race on the needle bearing rollers 206 is in rolling contact with the inner surface of the outer housing 52. As such, the coupling 50 transmits torsional input to the output housing 52 while permitting low frictional axial (vertical) displacement of the housing 52 with respect to the trunnion inner assembly 200.

As shown in FIG. 2, the housing 52 is preferably supported by a cap member 54 that is mounted to the hub 39. More particularly, at least one roller bearing 56 is located between the housing 52 and a cylindrical flange 58 extending downward from the cap member 54. Thus, the housing 52 is free to rotate with respect to the cap member 54.

A sun gear 60 is formed on a portion of the housing 52. While in the illustrated embodiment the sun gear 60 is shown as being integral with the housing 52, it is also contemplated that the sun gear 60 can be a separate gear that is attached to the housing 52. The sun gear 60 is preferably made from a high strength material, such as steel.

In order to use the rotary motion of the sun gear 60 to extend and retract the outer blade segments 18, the present invention incorporates a single stage planetary geartrain into the rotor hub assembly 20. The single stage planetary provides two functions. First, the single stage planetary reduces the actuation shaft 48 torque loads to a realistic operating value. Second, the compound planetary provides a predetermined travel time for the blade extension and retraction motion. The blade travel is a direct function of the actuation power source speed and the related gearing associated with the drive mechanism and the system actuation control unit.

Referring to FIGS. 2 and 3, the sun gear 60 provides input to the single stage planetary geartrain. In one embodiment, the planetary geartrain includes a pinion cage or support 70 which rotatably supports a plurality of pinion gears 62. The pinions gears 62 are disposed between and engage with the sun gear 60 and a ring gear 68. The ring gear 68 is located radially outward from the pinion gears 62 and is attached to the rotor hub 39 through any conventional means, such as a bolted attachment. The pinion gears 62 or the pinion cage 70 are interconnected with a hypoid bevel gear 76. More particularly, in the embodiment of the invention shown in FIG. 2, the hypoid bevel gear 76 is fixedly attached to the pinion cage 70 so as to be rotatable therewith about the rotational axis 24. The hypoid bevel gear 76 interacts with an output bevel pinion gear 78.

The intermeshing of the pinion gear 62 with the grounded ring gear 68 results in the desired rotational motion of the pinion cage 70 and the related hypoid bevel gear 76. The ring gear 68 and the pinion gears 62 are preferably both made from steel. In one embodiment of the invention, the intermeshing of the ring gear 68 and the pinion gears 62 provides about a 2.58:1 gear reduction and the single stage planetary gearset produces an overall gear ratio of 6:20:1. If desired, a compound planetary gear set may be configured to provide a gear ratio of 13:1 if additional reduction in applied torque and speed is required.

As shown in the illustrated embodiment, the pinion gears 62 are each rotatably mounted to the pinion cage 70 through a roller bearing 72. The pinion cage 70 is, in turn, in contact with and rotatably supported by the hub 39 through a roller assembly 74. Any conventional roller assembly 74 can be used to support the pinion cage 70. The lower hypoid bevel gear 76 is formed on the pinion cage 70 and defines a ring within the rotor hub assembly 20. The lower hypoid bevel gear 76 can be integral with the pinion cage 70, or may be separately bolted to the support as is illustrated. The lower hypoid bevel gear 76 meshes with the output pinion 78. As will be discussed in more detail below, the output pinion 78 is attached to the outer blade portion 18. The teeth on the lower hypoid bevel gear 76 and the output pinion 78 are formed so as to result in an intermeshing between the two gears along a line that intersects with the blade pitch pivot centerline 66 of the rotor blade 18 as shown in FIG. 3. The blade pitch centerline 66 is offset from the pivot center 44. The output pinion 78 is located within the main rotor hub assembly 20 and, thus, allows the rotor hub to achieve upwards of 12 degrees of pivotal motion with the gear mesh tracking with it. The intermeshing between the lower hypoid bevel gear 76 and the output pinion 78 defines a lower bevel stage of the planetary gear. The lower hypoid bevel gear 76 and the output pinion 78 are both preferably made from steel. In one embodiment of the invention, the meshing between the two gears provides a gear reduction of about 3.58:1.

As shown, roller bearings 80 permit the output pinion 78 to freely rotate about its rotational axis within the hub 39. The output pinion 78 is attached to a drive shaft 82 preferably through a splined connection. The drive shaft 82 preferably includes crowned splines that are capable of accommodating misalignment resulting from motion of the jackscrew 84 relative to its support bearing 86. In one embodiment of the invention, the quill shaft could include a disk type misalignment coupling identified in FIG. 2 by the numeral 83. One suitable disk coupling 83 is a Lucas coupling sold by Lucas Co., of Utica, N.Y. The jackscrew 84 is rotatably mounted within the rotor hub 39 and torque tube member 16.

Since in-plane and out-of-plane motions occur on the rotor blade 18, a flexible elastomeric bearing support 86 is preferably incorporated between the jackscrew 84 and the rotor hub 39 to reduce the effective bending loads applied to the jackscrew 84. More particularly, a hemispherical bearing 87 is located between a complimentary screw support 88 and hub support 89. The screw support 88 is rotatably disposed about the jackscrew 84. The hub support 89 is attached to the hub 39 through any conventional means known to those skilled in the art. The jackscrew 84 is preferably attached to the outer blade segment 18 through any conventional means, such as the attachment disclosed in U.S. Pat. No. 5,636,969.

The above described design of the present invention, with the planetary gear set positioned above and to the sides of the gimbaled bearing 26, allows the entire rotor hub assembly 20 to be easily removed from the main rotor shaft 22, thus facilitating maintenance and repair.

In order to more clearly understand the extension and retraction mechanism of the present invention, a brief discussion of the rotor systems' operation will now be provided. Starting with the variable diameter rotor blade assemblies 14 in their retracted position. The main rotor shaft 22 is rotated as is conventional in the art (i.e., the transmission rotates the main rotor shaft 22). For the illustrated aircraft configuration, a control mechanism is located in relation to the main rotor shaft such that power to operate the extension/retraction mechanism is derived from the main rotor shaft 22 at 250 RPMs and results in the rotation of the blade actuation shaft 48. This results in approximately 500 foot-pounds of torque input to the blade actuation shaft 48. When commanded, the blade extension/retraction control mechanism produces rotational forward and reverse output of the blade actuation shaft 48 relative to the main rotor shaft 22 at approximately 3144 RPMs. With the planetary gearset ratio of 6:20:1 and the hypoid gearset ratio of 3.58:1, the resulting jackscrew 84 rotational speed is approximately 872 RPMs.

In the non-operating modes, i.e., fully extended or fully retracted, the blade actuation shaft 48 is not rotating relative to the main rotor shaft 22, but is rotating at the same speed (250 RPMs) as the main rotor shaft 22. The blade actuation shaft 48 rotates the housing 52 of the constant velocity joint 50. This results in the sun gear 60 rotating about its rotational axis (which, when there is no deflection of the rotor hub assembly 20, coincides with the rotational axis 24 of the main rotor shaft 22 and the blade actuation shaft 48). The sun gear 60, in turn, rotates the pinion gears 62. Accordingly, the pinion gears 62 simply rotate about their rotational axis 62A while, at the same time, transitioning around the rotor hub assembly 20 at the same speed as the main rotor shaft 22.

When it is desired to extend the outer blade segment 18 of the rotor blade assembly 14, the blade actuation shaft 48 must be controlled so as to rotate at a speed that is relative to the main rotor shaft 22. This relative motion is either in the forward or reverse direction. The gearing in one embodiment of the invention is sized such that the relative speed of the blade actuation shaft 48 with respect to the main rotor shaft 22 in forward (extension) and reverse (retraction) directions is substantially the same. It must be noted that, since the retraction/extension mechanism is installed relative to the main transmission housing, the output speeds are determined relative to the 250 RPMs of the main rotor shaft 22 speed.

In the exemplary planetary gearset discussed above, the jackscrew 84 rotates at about 872 RPMs and at approximately 350 foot-pounds is limited by the maximum centrifugal force in the blade extended position, the jackscrew lead, and the efficiency of the jackscrew nut for each blade. This results in the outer blade segment 18 transitioning through a full 110 inches of extension in about 15 seconds.

Retraction of the outer blade segment 18 is accomplished by rotating the blade actuation shaft 48 again at a speed that is relative to the speed of the main rotor shaft 22 but in the opposite direction from extension.

Figure 7:
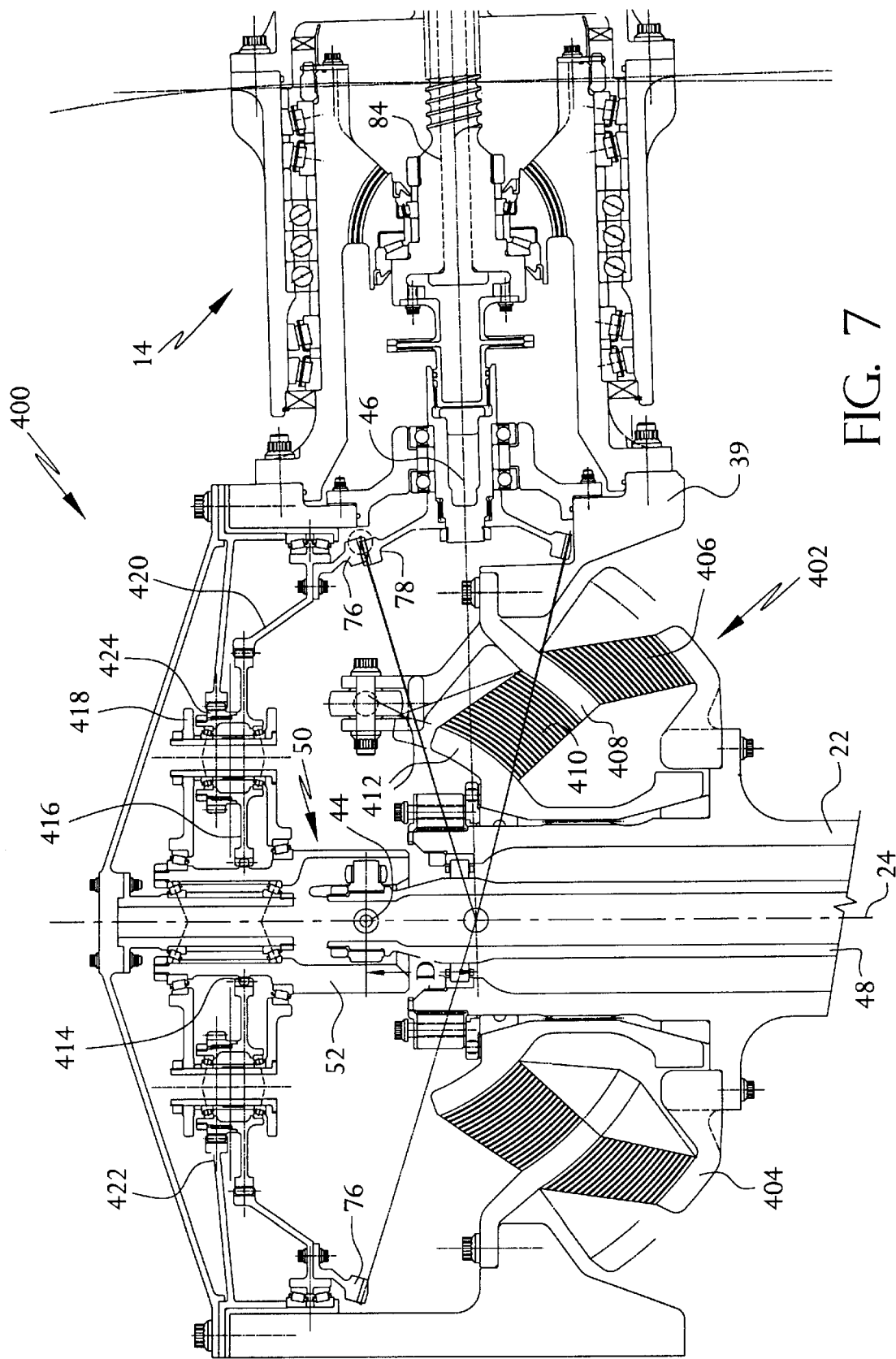
FIG. 7 is a cross-sectional side view of an alternate rotor hub assembly according to the present invention.

FIG. 7 illustrates an alternate rotor hub assembly 400. Many features of this assembly 400 as the same as the prior assembly discussed in detail above. As such, only the primary components that are different from the prior assembly are discussed hereinafter. The rotor hub assembly 400 includes a gimbaled bearing arrangement 402 which attaches the main rotor shaft 22 to the rotor blade assembles 14. As with the prior arrangement, the gimbaled bearing 402 transmits rotor thrust loads to the main rotor shaft 22 while permitting the hub assembly 400 to have limited angular movement.

The gimbaled bearing 402 includes a lower bearing support 404 which is attached to the main rotor shaft 22. A first elastomeric preload bearing 406 is located between the lower bearing support 404 and a lower surface of a blade bearing mount 408. A second elastomeric thrust bearing 410 is located between an upper surface on the blade bearing mount 408 and an upper bearing support 412. The upper bearing support is attached to the main rotor shaft 22 though any conventional mounting arrangement, such as the illustrated splined connection. The blade bearing mount 408 is fixedly attached to the rotor blade hub 39. A torque link 409 connects the blade bearing mount 408 to the upper bearing support 412 as shown in FIG. 8.

One common misconception in the prior art was that in order to provide proper pivoting of the rotor hub, the gimbaled bearings had to be arranged with their pivot center located on the center line of the rotor blade assembly. The primary deficiency with this mounting arrangement is that the blade typically has a pre-cone. As such, the center of mass of the blade does not typically lie along the center line of the rotor blade. Accordingly, the blade in these prior art arrangements would tend to droop when the aircraft was not in use, resulting in undesirable loading on the bearing from out-of-plane runout during start-up of the rotor. In one embodiment of the invention, this problem is alleviated by mounting the elastomeric bearings 32, 40 with their pivot center located at the intersection of the rotational axis 24 and a horizontal plane passing through the mass center of the rotor blade assembly 14. Since conventional rotor assemblies, such as the rotor assembly shown in FIG. 7, are designed with a "pre-cone", the mass center of the rotor blade assembly 14 will be located above the point where the pitch axis centerline 46 intersects the rotational axis 24. For example, in the rotor hub assembly 20 shown in FIG. 7, the pivot center 44 is located approximately 4.5 inches above the intersection of the blade pitch axis 46 with the rotational axis 24 (identified as D).

As discussed previously, the blade actuation shaft 48 is engaged to a planetary gearset through a liner constant velocity joint 50. As shown in this alternate embodiment, the outer housing 52 of the constant velocity joint 50 has a sun gear 414 formed on it. The sun gear 414 meshes with a pinion gear 416 that is rotatably supported by a pinion cage 418. The pinion cage 418, in turn, is rotatably supported by the outer housing 52 through a roller arrangement. The pinion gear 416 also meshes with a movable ring gear 420. The movable ring gear is disposed about the pinion cage 418 and is rotatably engaged with the rotor hub 39.

A lower hypoid pinion gear 76 is attached to or formed on the movable ring gear 420 and drivingly engages with the output pinion 78 for rotating the jackscrew 84 as discussed in the prior arrangement.

A fixed ring gear 422 is attached to the rotor hub 39 and meshes with a secondary pinion 424 that is splined to the pinion gear 416 so as to be rotatable in combination therewith.

The operation of the geartrain shown in FIGS. 7 and 8 will now be briefly discussed. The illustrated geartrain is a compound planetary version which allows for higher reduction ratios than can be achieved with a basic single stage. The compound planetary in this embodiment utilizes a double pinion arrangement and two ring gears. The input from the sun gear 414 rotates the first stage pinion gear 416 that is interconnected with a second stage pinion gear 424. The multiple pinions located on the pinion housing/cage 418 rotate around the input sun gear 414. The output is taken from the first stage ring gear 420 which is driven by the first stage pinions 416. The ring gear 420 is mechanically attached to the hypoid bevel gear 76. The rotational output of the planetary system is the result of the interaction of the second stage pinion 424 through the second stage ring gear 422 that is grounded to the rotor housing 39. In one embodiment of the invention, the planetary geartrain provides a reduction ratio of approximately 13:1.

The rotational sense of the planetary system is such that for either blade extension or retraction, all of the basic components rotate in the same direction. As in the description of the previously described embodiment the actuation is derived from the rotation of the main rotor shaft which rotates at 250 RPMs. An input rotation of the main rotor shaft 22 and the interconnected sun gear 414 causes a rotation of the double pinion that is opposite in sense. The cage housing 418 however rotates in the same sense as the sun gear 414. This rotational speed and direction is determined by the relative size of the gears in the planetary set. The relationship of the larger first stage pinion 416 and the smaller second stage pinion gear 424, that is reacting with the second stage ring gear 420, results in a rotational sense of the ring gear 420 that is in the same direction as the input sun gear 414, but at a speed relative to the reduction ratio speed of the planetary. Rotation of the ring gear 420 produces rotation of the output pinion 78.

In order to reduce the loading on the extension/retraction mechanism and, in particular, on the straps used to attach the outer blade segment 18 to the torque tube member 16, the present invention contemplates the incorporation of a locking mechanism 90 into the rotor blade assembly 14. The locking mechanism preferably locks the outer blade segment 18 to the torque tube and/or rotor hub 39 when the outer blade segment 18 is fully retracted. This eliminates the centrifugal loading that would otherwise be on the extension/retraction mechanism. In one embodiment of the invention, the locking mechanism 90 is a pin or breech type locking device. More particularly, upper and lower locking pins 92 are mounted to corresponding actuators 94 which, in turn, are supported by flanges on the hub or blade root. The locking pins 92 are mounted so as to engage with holes (not shown) formed in the outer blade segment 18 when the outer blade segment 18 is in its fully retracted position.

The benefits obtained from the present invention over prior art systems include the ability to provide controlled rates of the retraction or extension times for the outer blade segment 18 at a predetermined blade actuation shaft maximum input torque. The invention also provides a means for transmitting the operating torque through the angular displacement of a gimbaled rotor head while accommodating the axial displacement in the elastomeric gimbal bearing due to thrust loads.

Figure 4:
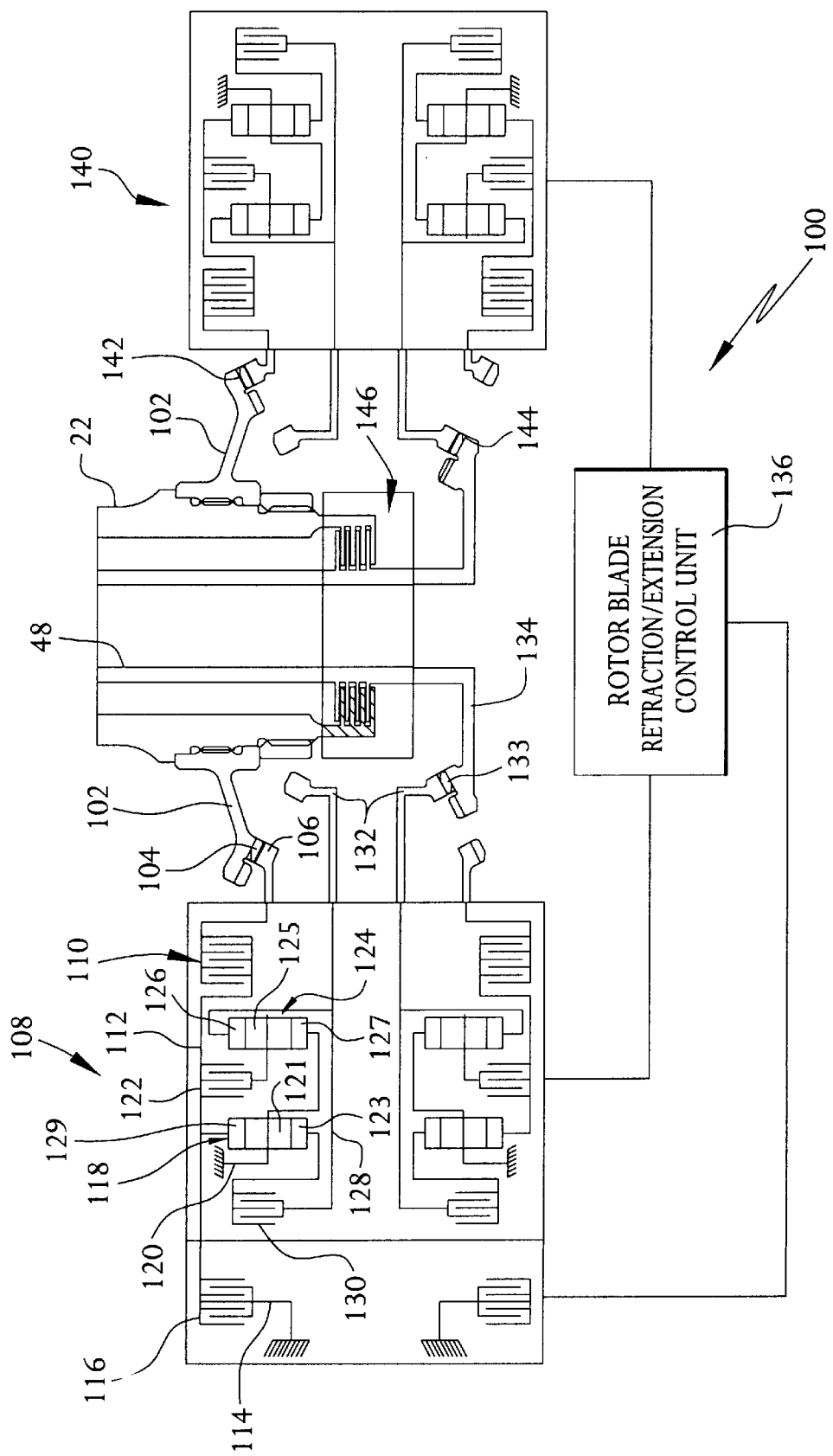
FIG. 4 is a schematic representation of retraction/extension actuation system for controlling retraction and extension of a variable diameter rotor blade.

Referring now to FIG. 4, a schematic diagram is shown depicting an embodiment of a preferred retraction/extension actuation system 100 for controlling the rotational speed of the blade actuation shaft 48 and, thus, the extension and retraction of the outer blade segment 18. The retraction/extension actuation system 100 is preferably mounted at or near the lower ends of the main rotor shaft 22 and the blade actuation shaft 48. The retraction/extension actuation system 100 provides approximately 300 HP (i. e., 100 HP per rotor blade) to control extension and retraction of the rotor system 10.

The retraction/extension actuation system 100 includes a bevel drive gear 102 which is shown disposed about and splined to the main rotor shaft 22 so as to be rotatable in combination therewith. The bevel drive gear 102 has a set of primary teeth 104 which mesh with mating teeth on an input gear 106 in a primary retraction/extension drive unit 108. The input gear 106 is engaged with a first or master clutch 110 which controls the engagement between the input gear 106 and a main drive 112. The main drive 112, in turn, is engaged with a fixed mount 114 via a disk brake 116. The brake 116 is actuated during blade extension as will be discussed in more detail below. The main drive 112 engages a forward fixed sun gear planetary gearset 124 and with a reverse fixed pinion planetary gearset 118.

A forward clutch 122 controls engagement between the main drive 112 and a forward planetary gearset 124. The forward planetary gearset 124 is defined as a fixed sun, single stage planetary which includes multiple pinions 125, an outer ring gear 126, and an inner sun gear 127. The forward clutch 122 is interconnected to the cage of the multiple pinions 125. The sun gear is interconnected to ground 120 through a cage of multiple pinions 121 on the reverse fixed pinion gearset 118. When the forward clutch 122 is engaged, the pinions 125 of the forward planetary gearset 124 rotate about the sun gear 127 resulting in rotation of the outer ring gear 126 in the forward direction. The outer ring gear 126 is interconnected through an output shaft 128 to output pinion 132.

The reverse planetary 118 is defined as a fixed pinion, single stage planetary which includes multiple pinions 121, an outer ring gear 129, and an inner sun gear 123. The input of a reverse clutch 130 is interconnected to the sun gear 123 and the output is interconnected to the output shaft 128. When the reverse clutch 130 is engaged, rotational input from the main drive 112 rotates the outer ring gear 129. The fixed or grounded cage of pinions 121 causes the sun gear 123 to rotate in the opposite direction, thereby resulting in reverse rotation of the output shaft 128.

The output drive 128 is coupled to an output bevel gear 132 which, in turn, is engaged with a primary set of teeth 133 on a blade actuation drive gear 134 formed on the blade actuation shaft 48.

A rotor blade actuation control unit 136 controls the engagement between the various clutches and the brake 116 in the primary retraction/extension drive unit 108. In one preferred embodiment of the invention, the actuation control unit 136 controls the actuation cycle by regulating engagement of one or more of the clutches and brake 116 according to a profile. More particularly, referring to FIG. 5, a prepogramed profile is shown for controlling actuation of the extension/retraction drive unit 108. The profile includes a ramp-up in operational speed that lasts for approximately 2–3 seconds. More particularly, during the ramp-up, the engagement between the master clutch 110 and the main drive 112 is allowed to slip until fully engaged. Similarly, there is a ramp down in operational speed when it is desired to disengage the clutches. The ramp-down also lasts for approximately 2–3 seconds, during which time the master clutch 110 is permitted to slip while operating in conjunction with brake 116. This cooperation of the master clutch 110 and brake 116 occurs during a blade extend cycle operation. During a blade extend cycle, the forward clutch 122 and the master clutch 110 are engaged. At the point of ramp-down, the forward clutch 122 is disengaged and modulated application of the brake 116 occurs with modulated disengagement of the master clutch 110 to ease the outer blade segment into its completely extended position. The engagement profile with its ramp-up and ramp-down portions helps to reduce the high load spike that would otherwise result in the system.

It is also contemplated that the rotor blade control unit 136 will monitor the blade operating system condition parameters to determine the overall health status of the rotor system. For example, the rotor blade control unit 136 may receive signals representing blade position, actuating oil pressure, and oil temperature. From this information a "go/no-go" decision can be made by the control unit 136. Additionally, the monitored information can be used to adjust the profile if needed. For example, the actual blade position can be monitored to adjust when the ramp-up and ramp-down occurs.

It is also contemplated that a secondary retraction/extension drive unit 140 may be incorporated into the system to provide redundancy in case of a failure in the primary drive unit. It is further contemplated that the secondary retraction/extension drive unit 140 can be designed to engage with a set of secondary teeth 142 located adjacent to the drive gear 102. Similarly, the output bevel gear in the secondary retraction/extension drive unit 140 can be configured to engage with secondary set of teeth 144 on a blade actuation shaft drive gear 134. The use of primary and secondary sets of teeth on the drive gear 102 and the blade actuation drive gear 134 is intended to provide redundancy in the system. If redundancy is not a concern, only one set of teeth on each gear would be required.

As shown in FIG. 4, the gearing arrangement in the secondary retraction/extension drive unit 140 is substantially the same as the gearing arrangement in the primary retraction/extension drive unit 108. Hence, no further discussion is needed. As with the primary retraction/extension drive unit 108, the secondary retraction/extension drive unit 140 is controlled by the rotor blade retraction/extension control unit 136.

The retraction/extension actuation system 100 is preferably arranged with the clutches oriented vertically as shown. This alleviates any pressure differentials and/or gyroscopic loads that might otherwise develop if the unit incorporated horizontally oriented clutches. The clutches and brakes that are used in the present invention are preferably an oil type that will have nearly identical static and dynamic coefficients of friction. In addition to the beneficial coefficient of friction, oil or wet type clutches and brakes also have better improved lubrication, and system health monitoring capability over dry type devices.

It is desirable that a gear ratio of 2:1 exist between the drive gear 102 and the input gear 106. It is also desirable that a gear ratio of 2:2 exist between the output bevel gear 132 and the blade actuation shaft 48.

The retraction/extension actuation system 100 also preferably includes a brake unit 146 which is used to lock the main rotor shaft 22 to the blade actuation shaft 48. The rotor blade control unit 136 preferably controls engagement of the brake unit 146. By allowing the rotor shafts to be locked into engagement, it is possible to unload (disengage) the primary drive unit 108 or secondary drive unit 140. The application of this function is desirable in the event of a detected malfunction in either the primary drive unit 108 or the secondary drive unit 140 during operation, allowing the system to lock in a fixed portion. Braking systems are well known in the art. See, for example, U.S. Pat. No. 5,299,912, the disclosure of which is incorporated herein by reference in its entirety.

The operation of the retraction/extension actuation system 100 will now be discussed. When the variable diameter rotor blade assembly 14 is in its retracted position (i.e., with the outer blade segment fully retracted), the main rotor shaft 22 and the blade actuation shaft 48 will be rotating concurrently at the same speed and in the same direction. The input gear 106 is in constant engagement with the main rotor shaft bevel gear 102 through the bevel gear mesh 104. Consequently the input gear 106 rotates at a constant 500 RPMs.

Figure 5:
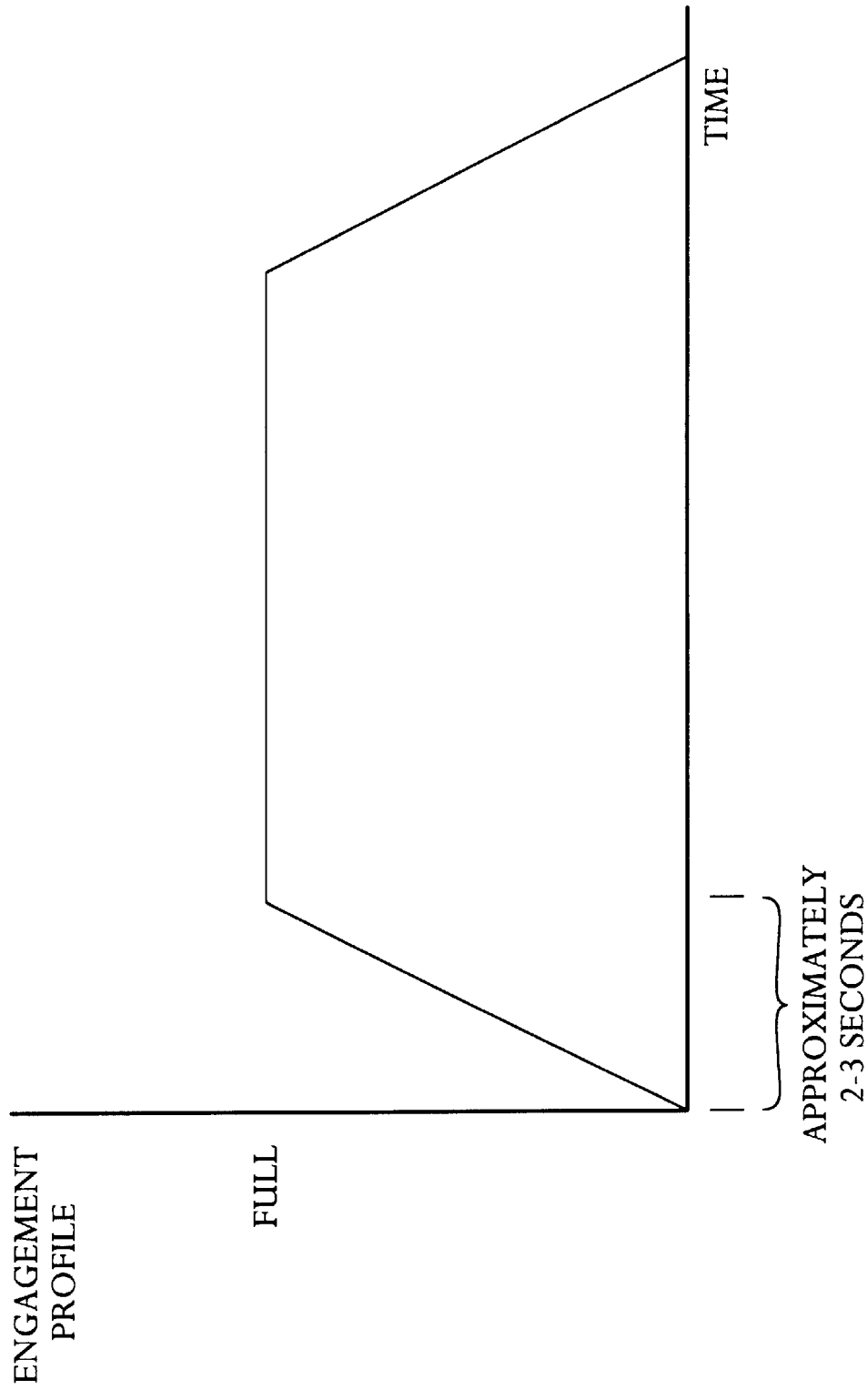
FIG. 5 is a graphical depiction of an engagement profile for use in the retraction/extension actuation system shown in FIG. 4.

To initiate an extension or a retraction operation, the rotor blade retraction/extension control unit 136 commands engagement of the appropriate clutch (e.g., forward clutch 122) in the drive unit 108 and then the master clutch 110. The rotor blade retraction/extension control unit 136 sequences the engagement of the master clutch 110 and brake 116 to achieve the desired profile as shown in FIG. 5. At the completion of the retraction or extension operation, the drive unit 108 is disengaged.

When the blade is fully retracted or extended, the blade extension mechanism must be restrained or locked so that the blade actuation shaft 48 can once again rotate at the same speed and in the same direction as the main rotor shaft 22. There are two methods for achieving this in the illustrated embodiment. First, the brake 146 can be applied to lock the shafts together. However, a more preferred method is to use the blade locking mechanism 90 to lock the outer blade segment. As discussed above and shown in FIG. 2, the blade locking mechanism 90 locks the outer blade segment to the blade root or hub 39 when the blade is in its retracted position. In order to unload the blade extension mechanism 100 when the blades are in the extended position, internal stops (not shown) are incorporated in the blades. The outer blade segment 18 contacts the stops when it reaches the fully extended position and the rotor blade's centrifugal force maintains blade in the extended position. The unloading of the blade extension/retraction mechanism 100 minimizes fatigue loading.

In order to initiate a blade extension from the retracted position with the blade locking mechanism 90, the centrifugal load must first be relieved in order to disengage the locking device. To accomplish this, the rotor blade/extension control unit 136 first initiates a blade retraction operation to "pull-in" the blades to relieve the centrifugal load on the blade locking mechanisms 90. This retraction sequence utilizes the same clutches and the brake used for the normal retraction operation, however the cycle will not follow the operation profile. More particularly, first the reverse (retract) clutch 130 is engaged, followed by the master clutch 110 to relieve the blade centrifugal load. At this point, the position brake 146 is engaged and the locking mechanisms 90 are disengaged (as determined by sensors). The forward (extend) clutch 122 is then engaged with the subsequent engagement of the master clutch 110 and the concurrent controlled release of the position brake 146.

The outer blade segments 18 extend in accordance with the normal operation profile shown in FIG. 5. At the 2–3 second ramp-down point, the application of brake 116 is controlled with the concurrent release of the master clutch 110, easing the blade onto the position stops.

When it is desired to retract the outer blade segment 18, the rotor blade control unit 136 initiates the following sequence of events. The reverse (retract) clutch 130 is engaged and then a controlled slip engagement of the master clutch 110 occurs to meet the 2–3 second "ramp-up" profile as defined in FIG. 5. As the outer blade segments 18 approach the retracted stop position, the rotor blade control unit 136 commands a controlled slip of the master clutch 110 to meet the "rampdown" profile specified in FIG. 5. At the point of engagement with retract position stops, the brake 146 engages and the blade locking mechanisms 90 are engaged. After the lock position sensors signal completion of the lock engagement sequence, the brake 146 is controlled to ease the centrifugal load onto the locks.

The above retraction/extension system 100 provides a novel mechanism for controlling the extension and retraction of a variable diameter rotor blade, such as the exemplary embodiment provided in this specification. The choice of gear set ratios in the retraction/extension system 100 may be selected to accommodate various rates of retraction or extension.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A rotor blade actuation system for a variable diameter rotor system, the variable diameter rotor system including a plurality of rotor blade assemblies mounted to and rotated by a rotor hub assembly about an axis of rotation, each rotor blade assembly having an inboard blade section and an outboard blade section, the outboard blade section being telescopically mounted to the inboard blade section, actuation of the outboard blade section is controlled by the rotor blade actuation system by varying the speed and direction between a main rotor shaft and a blade actuation shaft, the rotor blade actuation system comprising:

a drive gear on the main rotor shaft and having a first set of teeth thereon;

a blade actuation drive gear on the blade actuation drive shaft and having a first set of teeth thereon;

a primary drive unit for transmitting rotary motion from the main rotor shaft to the blade actuation shaft, the primary drive unit including an input gear engaged with the first set of teeth on the drive gear, a primary drive, a master clutch disposed between the input gear and the primary drive for controlling transmission of rotary motion therebetween, an output gear engaged with the first set of teeth on a blade actuation drive gear, an output drive engaged with the output gear, a forward planetary gearset operative for transmitting rotary motion from the primary drive to the output drive, a forward clutch for engaging the forward planetary gearset with the primary drive and the output drive, the engagement of the forward planetary gearset causing the blade actuation shaft to rotate in the same direction as the rotation of the main rotor shaft, a reverse planetary gearset operative for transmitting rotary motion from the primary drive to the output drive, and a reverse clutch for engaging the reverse planetary gearset with the primary drive and the output drive, the engagement of the reverse planetary gearset causing the blade actuation shaft to rotate in the opposite direction from the rotation of the main rotor shaft; and a rotor blade actuation control unit for controlling engagement and disengagement of the forward and reverse clutches.

2. A rotor blade actuation system according to claim 1 wherein the rotor blade actuation control unit includes a profile for controlling the engagement and disengagement of at least one of the clutches.

3. A rotor blade actuation system according to claim 2 wherein the profile includes ramp-up and ramp-down portions during which times the at least one clutch is permitted to slip.

4. A rotor blade actuation system according to claim 2 wherein the primary drive unit further includes a brake which is adapted to engage with the primary drive, and wherein the rotor blade actuation control unit uses the profile to control engagement and disengagement of the brake.

5. A rotor blade actuation system according to claim 4 wherein the rotor blade actuation control unit utilizes the profile to modulate disengagement of the brake while concomitantly modulating engagement of the master clutch.

6. A rotor blade actuation system according to claim 1 wherein the gear ratio between the drive gear and the input gear is about 2:1.

7. A rotor blade actuation system according to claim 1 wherein the gear ratio between the output gear and the blade actuation drive gear is about 2:2.

8. A rotor blade actuation system according to claim 1 further comprising a brake unit adapted to engage the main rotor shaft and the blade actuation shaft for locking the blade actuation shaft to the main rotor shaft.

9. A rotor blade actuation system according to claim 1 further comprising a secondary drive unit for transmitting rotary motion from the main rotor shaft to the blade actuation shaft in the event of failure of the primary drive unit, the secondary drive unit including a secondary input gear engaged with a second set of teeth on the drive gear, a secondary output gear engaged with a second set of teeth on a blade actuation drive gear, a secondary drive, an secondary output drive engaged with the secondary output gear, a secondary master clutch disposed between the secondary input gear and the secondary drive for controlling transmission of rotary motion therebetween, a secondary forward planetary gearset operative for transmitting rotary motion from the secondary drive to the secondary output drive, a secondary forward clutch for engaging the secondary forward planetary gearset with the secondary drive and the secondary output drive, the engagement of the secondary forward planetary gearset causing the blade actuation shaft to rotate in the same direction as the rotation of the main rotor shaft, a secondary reverse planetary gearset operative for transmitting rotary motion from the secondary drive to the secondary output drive, and a secondary reverse clutch for engaging the secondary reverse planetary gearset with the secondary drive and the secondary output drive, the engagement of the secondary reverse planetary gearset causing the blade actuation shaft to rotate in the opposite direction from the rotation of the main rotor shaft; and wherein the rotor blade control unit controls actuation of the clutches in the secondary drive unit.

10. A variable diameter rotor system for an aircraft comprising:

a main rotor shaft having an upper end, a lower end and an axis of rotation;

a plurality of rotor blade assemblies, each rotor blade assembly having an inboard blade section and an outboard blade section, the outboard blade section being telescopically mounted to the inboard blade section;

a screw drive rotatably disposed within the rotor blade assembly and engaged with the outboard blade section for telescoping the outboard blade section with respect to the inboard blade section, the jackscrew having an output pinion located at its inboard end, a rotor hub assembly mounted to the upper end of the rotor shaft, the inboard blade section of each rotor blade assembly being mounted to the rotor hub assembly such that the rotor blade assemblies are rotated by the rotor hub assembly;

a blade actuation shaft concentrically disposed within the main rotor shaft, the blade actuation shaft having an upper end and a lower end;

a planetary gear drive located within the rotor hub and engaging the upper end of the blade actuation shaft with the output pinion;

a drive gear on the lower end of the main rotor shaft and having a first set of teeth thereon;

a blade actuation drive gear on the lower end of the blade actuation drive shaft and having a first set of teeth thereon;

a primary drive unit for transmitting rotary motion from the main rotor shaft to the blade actuation shaft, the primary drive unit including an input gear engaged with the first set of teeth on the drive gear, a primary drive, a master clutch disposed between the input gear and the primary drive for controlling transmission of rotary motion therebetween, an output gear engaged with the first set of teeth on a blade actuation drive gear, an output drive engaged with the output gear, a forward planetary gearset operative for transmitting rotary motion from the primary drive to the output drive, a forward clutch for engaging the forward planetary gearset with the primary drive and the output drive, the engagement of the forward planetary gearset causing the blade actuation shaft to rotate in the same direction as the rotation of the main rotor shaft, a reverse planetary gearset operative for transmitting rotary motion from the primary drive to the output drive, and a reverse clutch for engaging the reverse planetary gearset with the primary drive and the output drive, the engagement of the reverse planetary gearset causing the blade actuation shaft to rotate in the opposite direction from the rotation of the main rotor shaft; and a rotor blade actuation control unit for controlling engagement and disengagement of the forward and reverse clutches.

11. A variable diameter rotor system according to claim 10 wherein the rotor blade actuation control unit includes a profile for controlling the engagement and disengagement of at least one of the clutches.

12. A variable diameter rotor system according to claim 11 wherein the profile includes ramp-up and ramp-down portions during which times the at least one clutch is permitted to slip.

13. A variable diameter rotor system according to claim 11 wherein the primary drive unit further includes a brake which is adapted to engage with the primary drive, and wherein the rotor blade actuation control unit uses the profile to control engagement and disengagement of the brake.

14. A variable diameter rotor system according to claim 13 wherein the rotor blade actuation control unit utilizes the profile to modulate disengagement of the brake while concomitantly modulating engagement of the master clutch.

15. A variable diameter rotor system according to claim 10 wherein the gear ratio between the drive gear and the input gear is about 1:2.

16. A variable diameter rotor system according to claim 10 wherein the gear ratio between the output gear and the blade actuation drive gear is about 2:1.

17. A variable diameter rotor system according to claim 10 further comprising a brake unit adapted to engage the main rotor shaft and the blade actuation shaft for locking the blade actuation shaft to the main rotor shaft.

18. A variable diameter rotor system according to claim 10 further comprising a secondary drive unit for transmitting rotary motion from the main rotor shaft to the blade actuation shaft in the event of failure of the primary drive unit, the secondary drive unit including a secondary input gear engaged with a second set of teeth on the drive gear, a secondary output gear engaged with a second set of teeth on a blade actuation drive gear, a secondary drive, an secondary output drive engaged with the secondary output gear, a secondary master clutch disposed between the secondary input gear and the secondary drive for controlling transmission of rotary motion therebetween, a secondary forward planetary gearset operative for transmitting rotary motion from the secondary drive to the secondary output drive, a secondary forward clutch for engaging the secondary forward planetary gearset with the secondary drive and the secondary output drive, the engagement of the secondary forward planetary gearset causing the blade actuation shaft to rotate in the same direction as the rotation of the main rotor shaft, a secondary reverse planetary gearset operative for transmitting rotary motion from the secondary drive to the secondary output drive, and a secondary reverse clutch for engaging the secondary reverse planetary gearset with the secondary drive and the secondary output drive, the engagement of the secondary reverse planetary gearset causing the blade actuation shaft to rotate in the opposite direction from the rotation of the main rotor shaft; and wherein the rotor blade control unit controls actuation of the clutches in the secondary drive unit.

* * * * *